United States Patent
Horita et al.

(10) Patent No.: US 11,055,907 B2
(45) Date of Patent: Jul. 6, 2021

(54) THREE-DIMENSIONAL DATA DISTRIBUTION DEVICE AND THREE-DIMENSIONAL DATA DISTRIBUTION METHOD

(71) Applicant: Panasonic Intellectual Property Management Co., Ltd., Osaka (JP)

(72) Inventors: Seiji Horita, Osaka (JP); Hiroshi Saito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/970,137

(22) PCT Filed: Nov. 28, 2018

(86) PCT No.: PCT/JP2018/043675
§ 371 (c)(1),
(2) Date: Aug. 14, 2020

(87) PCT Pub. No.: WO2019/163233
PCT Pub. Date: Aug. 29, 2019

(65) Prior Publication Data
US 2020/0402299 A1    Dec. 24, 2020

(30) Foreign Application Priority Data

Feb. 20, 2018 (JP) .............................. JP2018-028104

(51) Int. Cl.
*G06T 17/00* (2006.01)
*G06T 19/20* (2011.01)

(52) U.S. Cl.
CPC .............. *G06T 17/00* (2013.01); *G06T 19/20* (2013.01); *G06T 2210/36* (2013.01); *G06T 2219/2016* (2013.01)

(58) Field of Classification Search
CPC .......... G06T 17/00; G06T 19/00; G06T 19/20
See application file for complete search history.

(56) References Cited

U.S. PATENT DOCUMENTS 7,900,151 B2 * 3/2011 Gebhard ................ G06Q 10/06
715/764
2008/0163344 A1    7/2008 Yang
(Continued)

FOREIGN PATENT DOCUMENTS

JP    2002-91850    3/2002
JP    2003-61936    3/2003
(Continued)

OTHER PUBLICATIONS

International Search Report dated Feb. 5, 2019 in corresponding International Application No. PCT/JP2018/043675.
(Continued)

*Primary Examiner* — Todd Buttram
(74) *Attorney, Agent, or Firm* — Wenderoth, Lind & Ponack, L.L.P.

(57) ABSTRACT

A three-dimensional data distribution device includes: a communication unit that receives a transmission request, the transmission request being transmitted in accordance with a predetermined application and requesting transmission of three-dimensional model data, the three-dimensional model data indicating a three-dimensional shape of an object; and a controller that controls the transmission of the three-dimensional model data. The controller makes, based on the transmission request, at least one of a determination as to whether a first company is identical to a second company and a determination as to whether the first company has a partnership with the second company, the first company providing the predetermined application, the second company providing an equipment that has been used to generate the three-dimensional model data, and the controller con- (Continued)

trols the transmission of the three-dimensional model data in accordance with a result of the at least one of the determinations.

20 Claims, 9 Drawing Sheets

(56) References Cited

U.S. PATENT DOCUMENTS

| | | | |
|---|---|---|---|
| 2011/0029606 A1 | 2/2011 | Ozawa | |
| 2013/0344966 A1 | 12/2013 | Mustafa | |
| 2015/0128152 A1* | 5/2015 | Lachaume | H04L 67/1095 |
| | | | 719/316 |
| 2017/0280275 A1 | 9/2017 | Nagao | |
| 2018/0029298 A1 | 2/2018 | Takaya et al. | |

FOREIGN PATENT DOCUMENTS

| | | |
|---|---|---|
| JP | 2004-214744 | 7/2004 |
| JP | 2008-165807 | 7/2008 |
| JP | 2009-260818 | 11/2009 |
| JP | 2014-512199 | 5/2014 |
| JP | 2014-135710 | 7/2014 |
| JP | 2016-24760 | 2/2016 |
| JP | 2016-40649 | 3/2016 |
| JP | 2016-170488 | 9/2016 |
| JP | 2017-175546 | 9/2017 |
| WO | 2012/107739 | 8/2012 |

OTHER PUBLICATIONS

Written Opinion of the International Searching Authority dated Feb. 5, 2019 in corresponding International Application No. PCT/JP2018/043675 (with English translation).

* cited by examiner

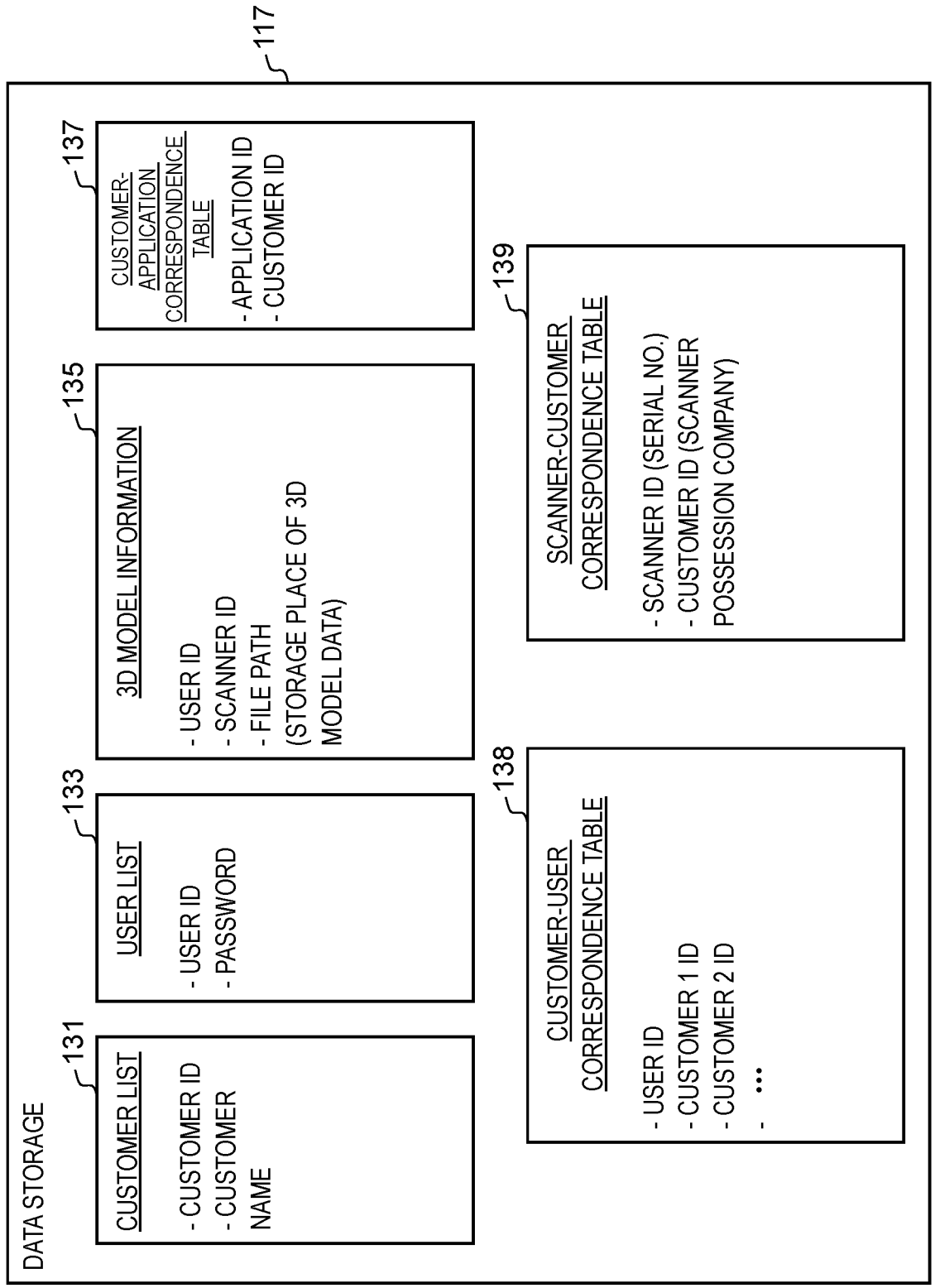

THREE-DIMENSIONAL DATA DISTRIBUTION DEVICE AND THREE-DIMENSIONAL DATA DISTRIBUTION METHOD

TECHNICAL FIELD

The present disclosure relates to a three-dimensional data distribution device and a three-dimensional data distribution method that distribute, via a network, three-dimensional model data indicating a three-dimensional (3D) shape of an object.

BACKGROUND ART

PTL 1 discloses a merchandise or the like providing system that provides merchandise or services to users via user terminals used by the users from a communication network that has been constructed due to mutual connection of a communication path.

The merchandise or the like providing system includes: a physical information acquisition unit that acquires, in a user terminal, physical information relating to physical features of a user; a user 3D information generator that generates object data in which the physical features have been reproduced, as 3D modeling information that is displayable in a virtual space; a merchandize or the like distribution server that is distributedly disposed on a communication network and distributes merchandise or the like information relating to merchandise or services; a merchandise or the like 3D information generator that generates merchandise or the like 3D information that is displayable on the virtual space on the basis of the merchandise or the like information acquired from the merchandise or the like information distribution server; a comparator that compares the 3D modeling information with the merchandise or the like 3D information; and a comparison result output unit that outputs a comparison result in the user terminal. This enables the user to easily check whether the merchandise fits the user themselves in the virtual space.

CITATION LIST

Patent Literature

PTL 1: Unexamined Japanese Patent Publication No. 2016-40649

SUMMARY OF THE INVENTION

Technical Problem

The present disclosure provides a three-dimensional data distribution device and a three-dimensional data distribution method that distribute, via a network, data indicating a three-dimensional shape of an object (for example, a user).

Solutions to Problem

A three-dimensional data distribution device provided in a first aspect of the present disclosure includes: a communication unit that receives a transmission request, the transmission request being transmitted in accordance with a predetermined application and requesting transmission of three-dimensional model data, the three-dimensional model data indicating a three-dimensional shape of an object; and a controller that controls the transmission of the three-dimensional model data. The controller makes, based on the transmission request, at least one of a determination as to whether a first company is identical to a second company and a determination as to whether the first company has a partnership with the second company, the first company providing the predetermined application, the second company providing an equipment that has been used to generate the three-dimensional model data, and the controller controls the transmission of the three-dimensional model data in accordance with a result of the at least one of the determinations.

Another three-dimensional data distribution device provided in a second aspect of the present disclosure includes: a communication unit that receives a transmission request, the transmission request being transmitted in accordance with a predetermined application and requesting transmission of three-dimensional model data, the three-dimensional model data indicating a three-dimensional shape of an object, the transmission request including user identification information that uniquely identifies a user that transmits the transmission request; and a controller that controls the transmission of the three-dimensional model data. The controller makes, based on the transmission request, at least one of a determination as to whether the user identified by the user identification information is a customer of a first company that provides the predetermined application and a determination as to whether the user is a customer of a third company that has a partnership with the first company. The controller controls the transmission of the three-dimensional model data in accordance with a result of the at least one of the determinations.

In a third aspect of the present disclosure, a three-dimensional data distribution method is provided for distributing three-dimensional model data indicating a three-dimensional shape of an object. In the three-dimensional data distribution method, a transmission request is received. The transmission request is transmitted in accordance with a predetermined application, and requests transmission of the three-dimensional model data. It is made, based on the transmission request, at least one of a determination as to whether a first company is identical to a second company and a determination as to whether the first company has a partnership with the second company, the first company providing the predetermined application, the second company providing an equipment that has been used to generate the three-dimensional model data. The transmission of the three-dimensional model data is controlled in accordance with a result of making of the least one of the determinations.

In a fourth aspect of the present disclosure, another three-dimensional data distribution method is provided for distributing three-dimensional model data indicating a three-dimensional shape of an object. In the other three-dimensional data distribution method, a transmission request is received. The transmission request is transmitted in accordance with a predetermined application, and requests transmission of the three-dimensional model data. The transmission request includes user identification information that uniquely identifies a user that transmits the transmission request. It is made, based on the transmission request, at least one of a determination as to whether the user identified by the user identification information is a customer of a first company that provides the predetermined application and a determination as to whether the user is a customer of a third company that has a partnership with the first company. The transmission of the three-dimensional model data is controlled in accordance with a result of making of the least one of the determinations.

Advantageous Effect of Invention

According to the present disclosure, a three-dimensional data distribution device and a three-dimensional data distribution method can be provided that distribute, via a network, three-dimensional model data indicating a three-dimensional shape of an object (for example, a user). In particular, the transmission of the three-dimensional model data is controlled in accordance with whether a predetermined condition is satisfied, such as a case where a company that has provided an application that has been used to issue a transmission request for the three-dimensional model data is identical to a company that possesses a 3D scanner that has been used to generate the three-dimensional model data or a case where a user that has issued the transmission request is a customer of the company that has provided the application, and this enables a user to effectively and safely utilize the three-dimensional model data.

BRIEF DESCRIPTION OF DRAWINGS

FIG. 4 is a diagram explaining various types of management information that are stored in a data storage of the 3D model management server.

DESCRIPTION OF EMBODIMENTS

Exemplary embodiments are described in detail below with reference to the drawings as appropriate. However, an unnecessarily detailed description may be omitted. For example, a detailed description of a well-known matter or a duplicate description of substantially the same configuration may be omitted. This is to avoid unnecessary redundancy in the description below and to make the description below easily understandable to those skilled in the art.

Note that the inventors provide the accompanying drawings and the description below to help those skilled in the art to fully understand the present disclosure, and the inventors do not intend to use the accompanying drawings or the description below to limit the subject matter described in the claims.

EXEMPLARY EMBODIMENT

[1-1. Configuration]

Figure 1:
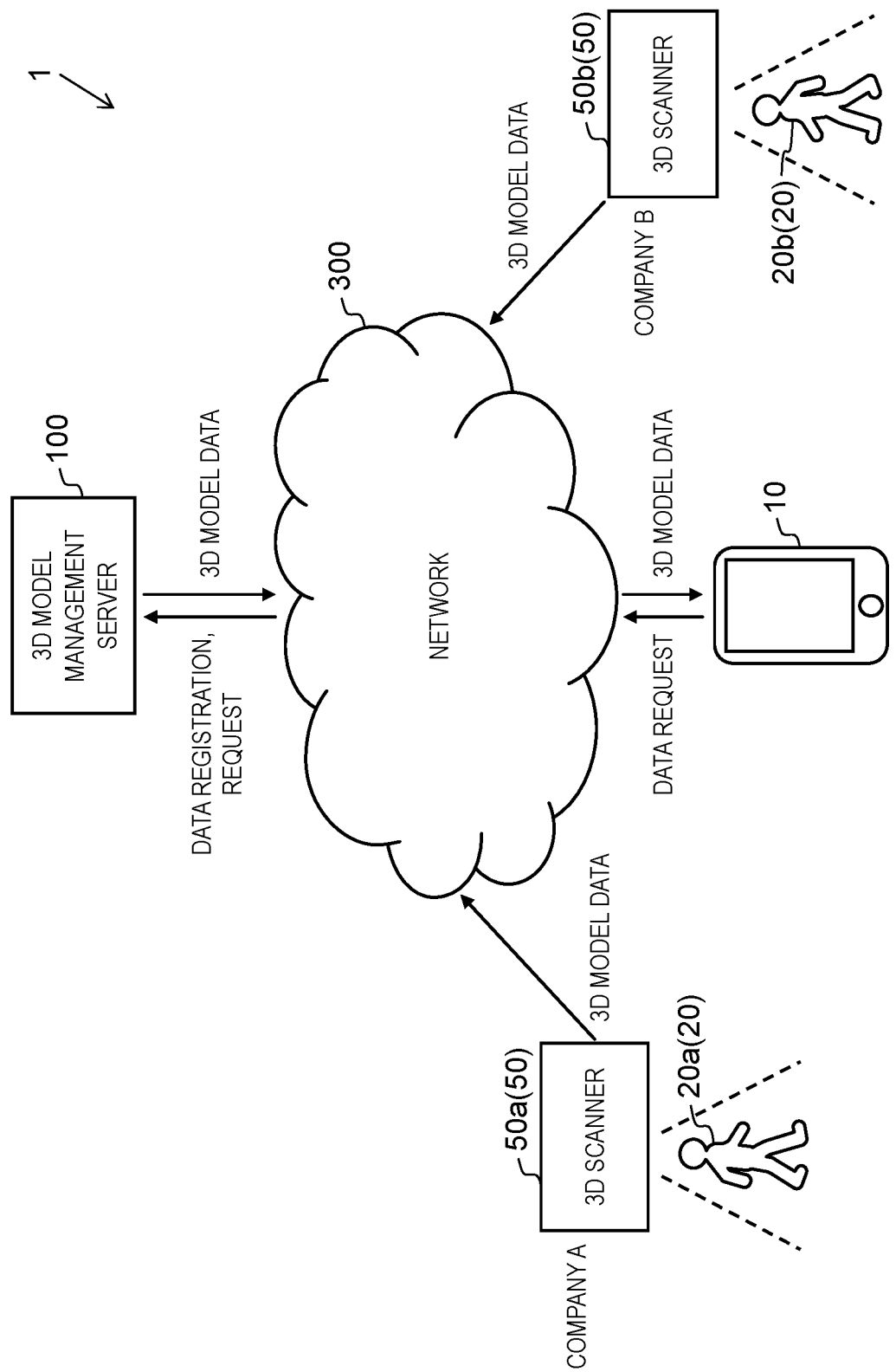
FIG. 1 is a diagram illustrating a network configuration of a 3D data distribution system.

FIG. 1 is a diagram illustrating a network configuration of 3D data distribution system 1 of the present disclosure. As illustrated in FIG. 1, 3D data distribution system 1 includes 3D scanners 50a, 50b (an example of an equipment used to generate three-dimensional model data), 3D model management server 100 (an example of a three-dimensional data distribution device), and portable terminal 10 (an example of an external equipment). 3D scanners 50a, 50b, 3D model management server 100, and portable terminal 10 are connected via network 300. An example where two 3D scanners 50a, 50b are connected to network 300 is described below, but a number of 3D scanners is not limited to two, and 3D scanners connected to a network are collectively referred to as 3D scanners 50.

3D scanner 50 includes a scanner that scans object 20 and generates 3D model data indicating a three-dimensional shape of object 20, and a communication unit that transmits the generated 3D model data to 3D model management server 100. Stated another way, 3D scanner 50 scans object 20 (for example, a person), and generates 3D model data indicating three-dimensional information relating to object 20. In the present exemplary embodiment, it is assumed that a target to be scanned is a user's body. The 3D model data includes shape information indicating a three-dimensional shape of object 20, color information (surface layer image information) indicating a color or a pattern of a surface of object 20, and skeletal information indicating a position of each portion of object 20 (a user's body). The 3D model data is, for example, an OBJ format file (an extension is "obj") or an FBX format file (an extension is "fbx").

3D scanner 50 transmits the generated 3D model data to 3D model management server 100. 3D model management server 100 stores and manages the 3D model data received from 3D scanner 50. The user issues a transmission request to request that 3D model management server 100 distribute the 3D model data, by using an application (a dedicated application) installed in portable terminal 10. The dedicated application is an application program for providing a predetermined service using the 3D model data (hereinafter referred to as the "present service"). Portable terminal 10 transmits the transmission request to 3D model management server 100 in accordance with the dedicated application. 3D model management server 100 transmits the requested 3D model data to portable terminal 10 that has transmitted the transmission request.

Network 300 is the Internet, a local area network (LAN), a wide area network (WAN), or the like.

[1-1-1. Portable Terminal]

Figure 2:
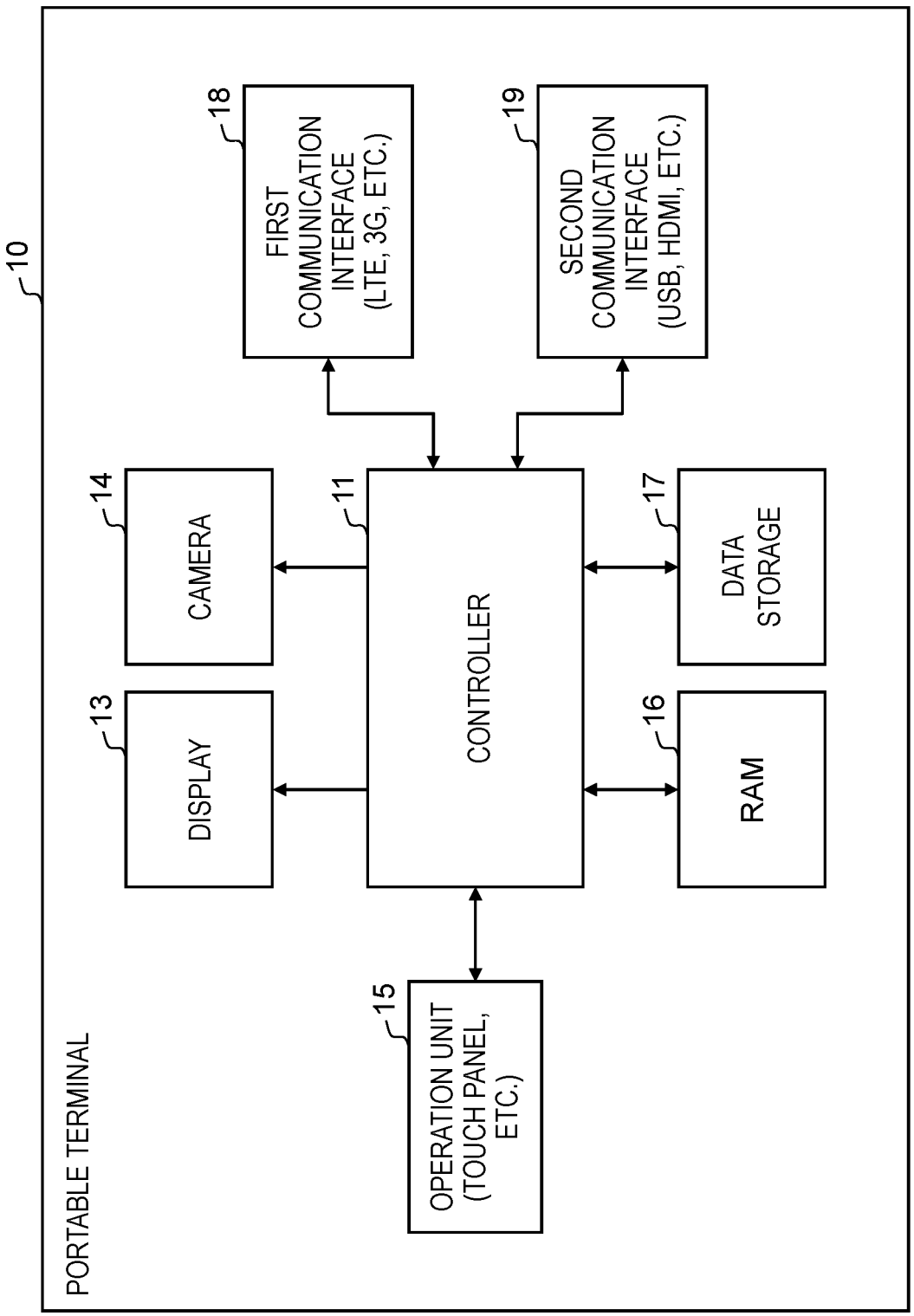
FIG. 2 is a block diagram illustrating a configuration of a portable terminal.

FIG. 2 is a block diagram illustrating a configuration of portable terminal 10. In the present exemplary embodiment, a smartphone is assumed as an example of portable terminal 10, but portable terminal 10 may be a personal digital assistant (PDA), a portable telephone, or the like.

Portable terminal 10 includes camera 14 that captures an image, display 13 that displays information such as an image, and operation unit 15. Further, portable terminal 10 includes first communication interface 18 that performs communication to establish connection to a public network, and second communication interface 19 that performs communication with another electronic device. Furthermore, portable terminal 10 includes random access memory (RAM) 16 and data storage 17 that store data or the like, and controller 11 that controls an entire operation of portable terminal 10.

Camera 14 includes an image sensor such as a charge coupled device (CCD) or a complementary metal oxide semiconductor (CMOS) image sensor. Camera 14 images a subject, and generates image data.

Display 13 includes, for example, a liquid crystal display or an organic electroluminescence (EL) display. Display 13 displays, for example, an application for providing the present service and an image based on 3D model data relating to the present service. Operation unit 15 is disposed to be superimposed onto an upper surface of display 13, and includes a touch panel that receives a touch operation performed by a user.

Operation unit 15 further includes an operation button. The operation button includes a button that has been physically provided in a body of portable terminal 10 or a virtual button that is implemented by display 13 and a touch panel function.

First communication interface 18 includes a communication module (a circuit) for connection with the public network, and performs communication according to communication standards such as long term evolution (LTE) or 3G. Second communication interface 19 is a communication module (a circuit) for wireless communication with another electronic device in a relatively near field, and performs communication according to communication standards such as WiFi or Bluetooth. Second communication interface 19 may perform communication with another electronic device via a cable, and may perform data communication according to standards such as universal serial bus (USB), high definition multimedia interface (HDMI) (registered trademark), Bluetooth (registered trademark), or WiFi.

RAM 16 is a storage element that transitorily stores a program or data, and functions as a work region of controller 11. Data storage 17 is a recording medium that stores a program or various types of data, and may include a recording medium such as a hard disk drive (HDD), a solid state drive (SSD), a semiconductor memory, or a detachable memory card. In data storage 17, a program (an operating system (OS) or an application program) that will be executed by controller 11 and data are stored. The dedicated application for the present service is also stored in data storage 17.

Controller 11 includes a central processing unit (CPU) or a micro processing unit (MPU). Controller 11 executes the application program stored in data storage 17 to realize predetermined functions described later. The application program may be provided via network 300, or may be provided by a recording medium such as a compact disc read-only memory (CD-ROM). In the present exemplary embodiment, controller 11 executes the dedicated application of the present service to transmit a transmission request for 3D model data to 3D model management server 100 via first communication interface 18.

[1-1-2. 3D Model Management Server]

Figure 3:
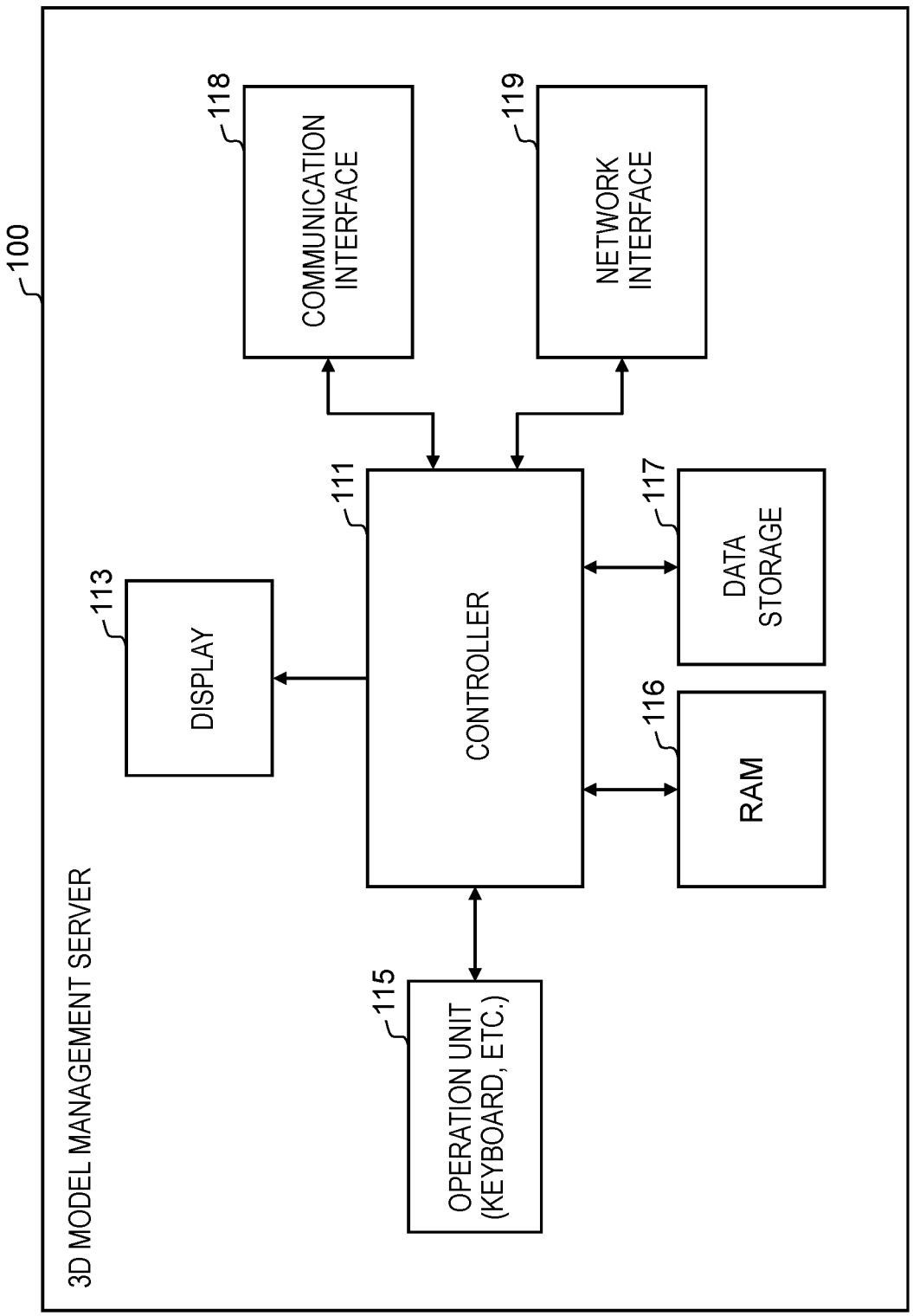
FIG. 3 is a block diagram illustrating a configuration of a 3D model management server.

FIG. 3 is a block diagram illustrating a configuration of 3D model management server 100. 3D model management server 100 includes controller 111 that controls an entire operation of 3D model management server 100, display 113 that conducts a screen display, operation unit 115 that a user performs an operation on, and RAM 116 and data storage 117 that store data or a program. Display 113 includes, for example, a liquid crystal display or an organic EL display. Operation unit 115 includes a keyboard, a mouse, a touch panel, or the like. When 3D model management server 100 is operated via a network, display 113 and operation unit 115 may be omitted from 3D model management server 100.

3D model management server 100 further includes communication interface 118 for connection to peripheral equipment such as a printer, and network interface 119 for connection to a network. Communication interface 118 includes a communication module (a circuit) that communicates data or the like according to USB, HDMI, IEEE 1394, or the like. Network interface 119 is a communication module (a circuit) that performs data communication according to standards such as IEEE 802.11 or WiFi. 3D model data from 3D scanner 50 and a transmission request from portable terminal 10 are received via network interface 119. When 3D model management server 100 is a virtual machine and other cases, communication interface 118 may be omitted.

Controller 111 includes a CPU or an MPU. Controller 111 executes a predetermined control program stored in data storage 117 to realize predetermined functions. The control program that will be executed by controller 111 may be provided via network 300, or may be provided by using a recording medium such as a CD-ROM.

RAM 116 is a storage element that transitorily stores a program or data, and functions as a work region of controller 111. Data storage 117 is a recording medium that stores a parameter that is needed to realize functions of 3D model management server 100, data, and a program. Data storage 117 stores a control program that will be executed by controller 111 or various types of data. Data storage 117 includes, for example, a hard disk drive (HDD) or an SSD. The control program has been installed in data storage 117. Controller 111 executes this control program to realize the functions described later of 3D model management server 100.

FIG. 4 is a diagram explaining various types of management information that are stored in data storage 117 of 3D model management server 100. 3D model management server 100 stores, in data storage 117, customer list 131, user list 133, 3D model information 135, customer-application correspondence table 137, customer-user correspondence table 138, and scanner-customer correspondence table 139. Respective pieces of management information are described below.

(1) Customer List

Customer list 131 is management information that manages information relating to customers. Customer list 131 manages customer ID that is identification information of a customer, and a customer name. A customer managed in customer list 131 is a customer with respect to a management company that manages 3D model management server 100 (hereinafter referred to as a "data management company" in some cases). A customer of this data management company possesses a 3D scanner, and requests that this data management company manage 3D model data generated by the 3D scanner of a company of the customer.

In addition, the customer of this data management company provides a dedicated application for providing a predetermined service to a user by using the 3D model data generated by the 3D scanner of the company of the customer (the "customer of the data management company" may be referred to as an "application providing company"). For example, the dedicated application can provide an image at a time when a user puts on (tries on) desired clothes in a virtual space, by using 3D model data that corresponds to the user. Alternatively, the dedicated application can make a user take a desired action in a virtual space.

The application providing company is also a scanner possession company from the viewpoint of possession of the 3D scanner. A case where an application providing company possesses a 3D scanner is described below. However, the application providing company does not always need to possess the 3D scanner in the strict sense, and it is sufficient if the application providing company can provide the 3D scanner in order to generate 3D model data. In the example of FIG. 1, Company A and Company B respectively possess or provide 3D scanner 50a and 3D scanner 50b.

(2) User List

User list 133 is management information that manages information relating to users. User list 133 manages user ID that is user identification information, and a password. A user can generate 3D model data of the user themselves by using a 3D scanner possessed by a customer (an application providing company), and can use a predetermined service using the 3D model data, by using a dedicated application provided by the customer.

(3) 3D Model Information 3D model information 135 manages information relating to 3D model data for each user. 3D model information 135 manages user ID, scanner ID that is identification information of a 3D scanner that has been used to generate 3D model data, and a storage place (for example, a pathname, a uniform resource locator (URL), or the like) of the 3D model data. When one user has generated 3D model data by using each of a plurality of 3D scanners, respective records for pieces of 3D model data that have respectively been generated using the plurality of 3D scanners are registered for the one user in 3D model information 135.

(4) Customer-Application Correspondence Table

Customer-application correspondence table 137 is information for managing an application provided by a customer (an application providing company). Customer-application correspondence table 137 manages application ID that is identification information of the application, and customer ID.

(5) Customer-User Correspondence Table

Customer-user correspondence table 138 is information that manages a relationship between a customer (an application providing company) and a user. Customer-user correspondence tale 138 manages, for each user, user ID and customer ID of a customer that relates to a user. When a user is associated with a plurality of customers, customer-user correspondence table 138 manages a plurality of pieces of customer ID for one user.

(6) Scanner-Customer Correspondence Table

Scanner-customer correspondence table 139 is information that manages a relationship between a 3D scanner and a customer (a scanner possession company) that possesses the 3D scanner. Scanner-customer correspondence table 139 manages, for each 3D scanner, scanner ID and customer ID of a customer who possesses a 3D scanner.

[1-2. Operation]

One example of an operation of 3D data distribution system 1 configured as described above is described. A user scans the user's body by using 3D scanner 50 possessed by a certain application providing company (a customer of a data management company), and generates 3D model data. The generated 3D model data is transmitted to 3D model management server 100 via network 300, and is registered in 3D model information 135. The user can use the user's 3D model data by activating a predetermined application on portable terminal 10. In this case, the application of portable terminal 10 transmits, to 3D model management server 100, a transmission request that is an instruction to request that the user's 3D model data be distributed.

In the example of FIG. 1, a user of Company A (an application providing company) generates 3D model data of the user themselves (object 20a) by using 3D scanner 50a possessed by Company A, and transmits a transmission request for the 3D model data to 3D model management server 100 by using an application provided by Company A. Similarly, a user of Company B (an application providing company) generates 3D model data of the user themselves (object 20b) by using 3D scanner 50b possessed by Company B, and transmits a transmission request for the 3D model data to 3D model management server 100 by using an application provided by Company B.

Upon receipt of a transmission request from portable terminal 10, 3D model management server 100 performs setting to enable the transmission of 3D model data when a predetermined condition is satisfied. Performing setting to enable the transmission of 3D model data includes both transmitting the 3D model data to portable terminal 10 and causing a state where the 3D model data can be obtained (can be downloaded). When the application of portable terminal 10 obtains the 3D model data from 3D model management server 100, the application provides the user with a predetermined service using the obtained 3D model data.

Some processing examples are described below with respect to processing performed by 3D model management server 100 at the time of reception of a transmission request for 3D model data from portable terminal 10.

(1) First Processing Example

Figure 5A:
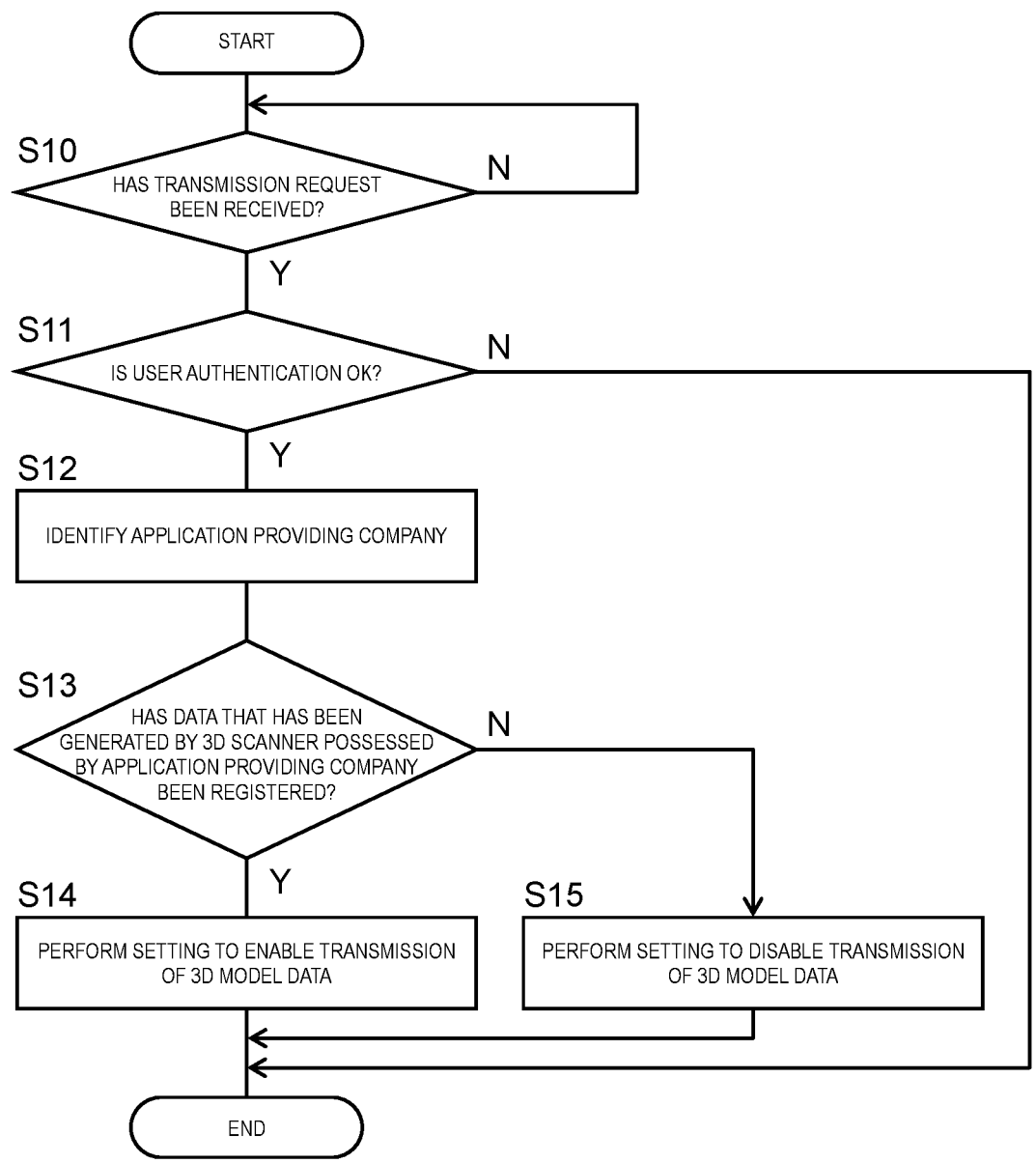
FIG. 5A is a flowchart illustrating data distribution processing (a first processing example) that is performed by the 3D model management server.

FIG. 5A is a flowchart illustrating a first processing example of 3D model management server 100 at the time of reception of a transmission request for 3D model data from portable terminal 10. This processing is performed by controller 111 of 3D model management server 100.

A user operates a predetermined application on portable terminal 10. This application is an application using 3D model data generated by a 3D scanner. This application is provided from an application providing company that possesses the 3D scanner in order to use the 3D model data generated by the 3D scanner.

The application of portable terminal 10 transmits a transmission request for the user's 3D model data to 3D model management server 100 in accordance with an operation performed by the user. The transmission request includes user ID that is identification information of a user who has logged in the application, an authentication password of the user, and application ID that is identification information of the application, in addition to a command to request that the 3D model data be transmitted.

With reference to FIG. 5A, when 3D model management server 100 receives a transmission request for 3D model data from portable terminal 10 (YES in S10), controller 111 refers to user list 133 and performs processing for authenticating a user on the basis of user ID and a password that are included in the transmission request (S11). If an authentication result is NG, and stated another way, if the user is not a proper user (NO in S11), this processing is terminated.

If the authentication result is OK, and stated another way, if the user is a proper user (YES in S11), controller 111 identifies an application providing company (a customer of a data management company) that has provided an application that has transmitted the transmission request (S12). Therefore, controller 111 obtains application ID included in the transmission request, refers to customer-application correspondence table 137, and identifies customer ID associated with the application ID. This customer ID indicates an application providing company of the application that has issued the transmission request. By doing this, the application providing company that has issued the transmission request can be identified.

Then, controller 111 determines whether 3D model data that has been generated by 3D scanner 50 that is possessed by the application providing company of the application that has issued the transmission request has been registered in 3D model information 135 (S13). The determination of step S13 is a synonym of determination of whether the application providing company is identical to a company that possesses the 3D scanner that has generated the 3D model data.

Specifically, controller 111 refers to scanner-customer correspondence table 139, and obtains scanner ID that corresponds to the customer ID identified in step S12. Then, controller 111 refers to 3D model information 135, and checks whether a record has been registered that has been associated with the user ID included in the transmission request and the obtained scanner ID. By using this method, it can be determined whether the 3D model data that has been generated by 3D scanner 50 that is possessed by the application providing company of the application relating to the transmission request has been registered in 3D model information 135.

When the 3D model data that has been generated by 3D scanner 50 that is possessed by the application providing company of the application relating to the transmission request has been registered in 3D model information 135 (YES in S13), controller 111 enables the transmission of the 3D model data to the user (S14). In contrast, when the 3D model data that has been generated by 3D scanner 50 that is possessed by the application providing company has not been registered in 3D model information 135 (NO in S13), controller 111 disables the transmission of the 3D model data (S15). Here, enabling the transmission of 3D model data includes transmitting the 3D model data to portable terminal 10 and/or causing a state where the 3D model data can be downloaded. When the transmission of the 3D model data is disabled, portable terminal 10 fails to obtain the 3D model data from 3D model management server 100.

By performing the processing above, only when an application providing company of an application that has issued a transmission request is identical to a company that possesses 3D scanner 50 that has generated 3D model data, the 3D model data can be accessed. Stated another way, in this processing example, even if access to 3D model data is requested from an application provided by Company B that is different from Company A that possesses a 3D scanner that has generated the 3D model data, the 3D model data fails to be accessed.

(2) Second Processing Example

Figure 5B:
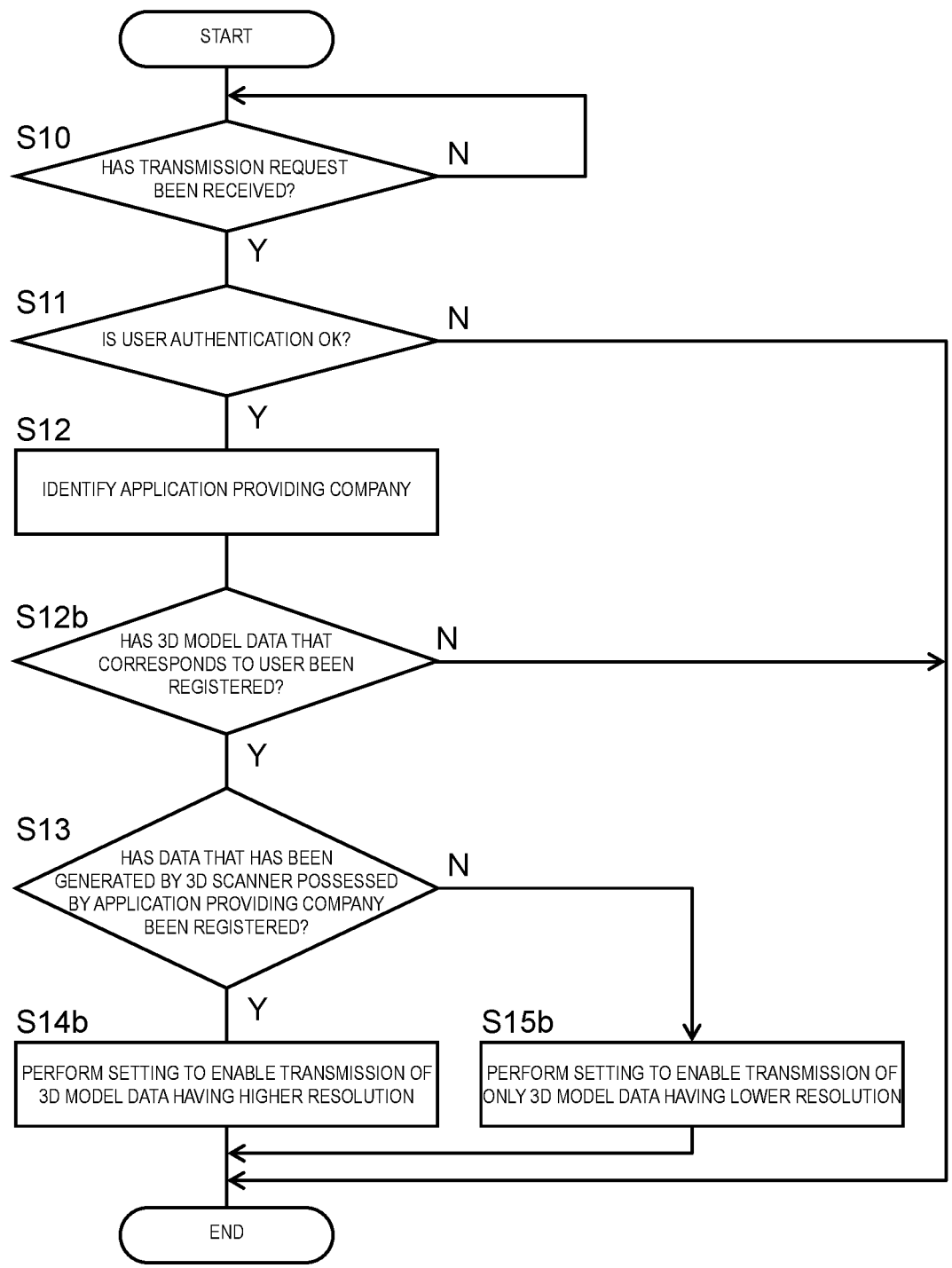
FIG. 5B is a flowchart illustrating data distribution processing (a second processing example) that is performed by the 3D model management server.

FIG. 5B is a flowchart illustrating a second processing example of 3D model management server 100 at the time of reception of a transmission request for 3D model data from portable terminal 10.

In the example illustrated in FIG. 5A, when an application providing company is not identical to a company that possesses a 3D scanner that has generated 3D model data, setting is performed to disable the transmission of the 3D model data. An example is described below where setting is performed to enable the transmission of 3D model data having a lower resolution when both are not identical to each other. Therefore, in this example, 3D model management server 100 generates, in advance, 3D model data having a lower resolution on the basis of original 3D model data, with respect to 3D model data generated by a 3D scanner, and manages the generated 3D model data. Alternatively, 3D model data having a lower resolution may be generated on the basis of original 3D model data at any time as needed.

As illustrated in FIG. 5B, when a transmission request is received (YES in S10), controller 111 performs user authentication (S11), and identifies an application providing company of an application that has issued the transmission request (S12). Then, controller 111 determines whether 3D model data that corresponds to an authenticated user has been registered in 3D model information 135 (S12*b*). Specifically, it is determined whether 3D model information 135 includes a record associated with user ID included in the transmission request.

When 3D model data that corresponds to the user has not been registered (NO in S12*b*), this processing is terminated.

When 3D model data that corresponds to the user has been registered (YES in S12*b*), controller 111 determines whether 3D model data that has been generated by 3D scanner 50 that is possessed by the application providing company of the application relating to the transmission request has been registered in 3D model information 135 (S13).

When the 3D model data that has been generated by 3D scanner 50 that is possessed by the application providing company of the application relating to the transmission request has been registered in 3D model information 135 (YES in S13), controller 111 enables the transmission of 3D model data having a higher resolution to the user (S14*b*). In contrast, when the 3D model data that has been generated by 3D scanner 50 that is possessed by the application providing company has not been registered in 3D model information 135 (NO in S13), controller 111 enables the transmission of only 3D model data having a lower resolution to the user (S15*b*).

As described above, in this processing example, when an application providing company of an application that has performed access is not identical to a company that possesses 3D scanner 50 that has generated 3D model data, only 3D model data having a lower resolution is enabled to be transmitted.

For example, when 3D model data has been requested by using an application provided by a company that possesses a 3D scanner that has generated the 3D model data, a user can obtain 3D model data having a higher resolution. In contrast, when 3D model data has been requested by using an application of Company B that is different from Company A that possesses a 3D scanner that has generated the 3D model data, a user can only obtain 3D model data having a lower resolution. This is, for example, a case where the use of 3D model data having a higher resolution is permitted when Company A uses an application of Company A itself, and a proper user is permitted to only use 3D model data having a lower resolution even when another application is used.

(3) Third Processing Example

In this processing example, when a user is a customer of an application providing company, 3D model data is enabled to be transmitted to the user. When a user is not the customer, 3D model data is disabled from being transmitted to the user.

Figure 6A:
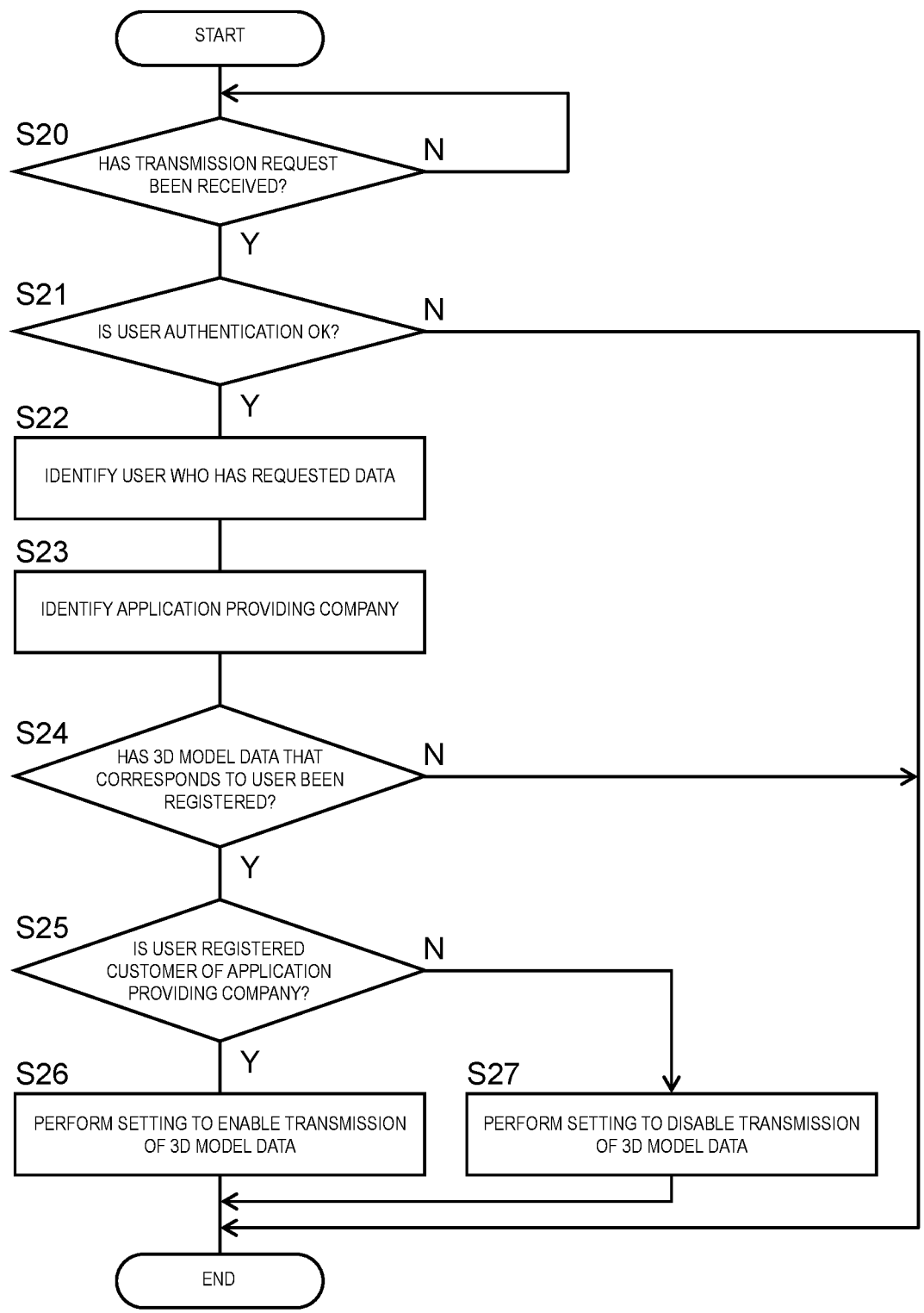
FIG. 6A is a flowchart illustrating data distribution processing (a third processing example) that is performed by the 3D model management server.

FIG. 6A is a flowchart that further illustrates a third processing example of data distribution processing that is performed by 3D model management server 100.

When 3D model management server 100 receives a transmission request from portable terminal 10 (YES in S20), controller 111 refers to user list 133 and performs authentication processing on the basis of user ID and a password that are included in the transmission request (S21). If an authentication result is NG (NO in S21), this processing is terminated.

If the authentication result is OK (YES in S21), controller 111 identifies a user that has issued the transmission request for 3D model data (S22). Therefore, controller 111 obtains the user ID included in the transmission request. Further, controller 111 identifies an application providing company (specifically, customer ID) of an application that has transmitted the transmission request (S23). The application providing company is identified, as in the description of step S12.

Then, controller 111 determines whether 3D model data that corresponds to the user that has issued the transmission request for 3D model data has been registered in 3D model information 135 (S24). When the 3D model data that corresponds to the user has not been registered (NO in S24), this processing is terminated.

When the 3D model data that corresponds to the user has been registered (YES in S24), controller 111 determines whether the user that has issued the transmission request for 3D model data has been registered as a customer of the application providing company of the application that has transmitted the transmission request (S25). This determination can be performed by referring to customer-user correspondence table 138.

When the user that has issued the transmission request for 3D model data has been registered as a customer of the application providing company of the application relating to the transmission request (YES in S25), controller 111 enables the transmission of the 3D model data (S26). In contrast, when the user has not been registered as a customer of the application providing company (NO in S25), controller 111 disables the transmission of the 3D model data (S27).

By employing the configuration described above, only when a user that has issued a transmission request for 3D model data has been registered as a customer of an application providing company of an application relating to the transmission request, the 3D model data can be transmitted.

(4) Fourth Processing Example

In the example of FIG. 6A, whether 3D model data will be enabled to be transmitted is determined on the basis of a result of determining whether a user has been registered as a customer of an application providing company. However, a resolution of 3D model data to be transmitted may be changed on the basis of a determination result.

Figure 6B:
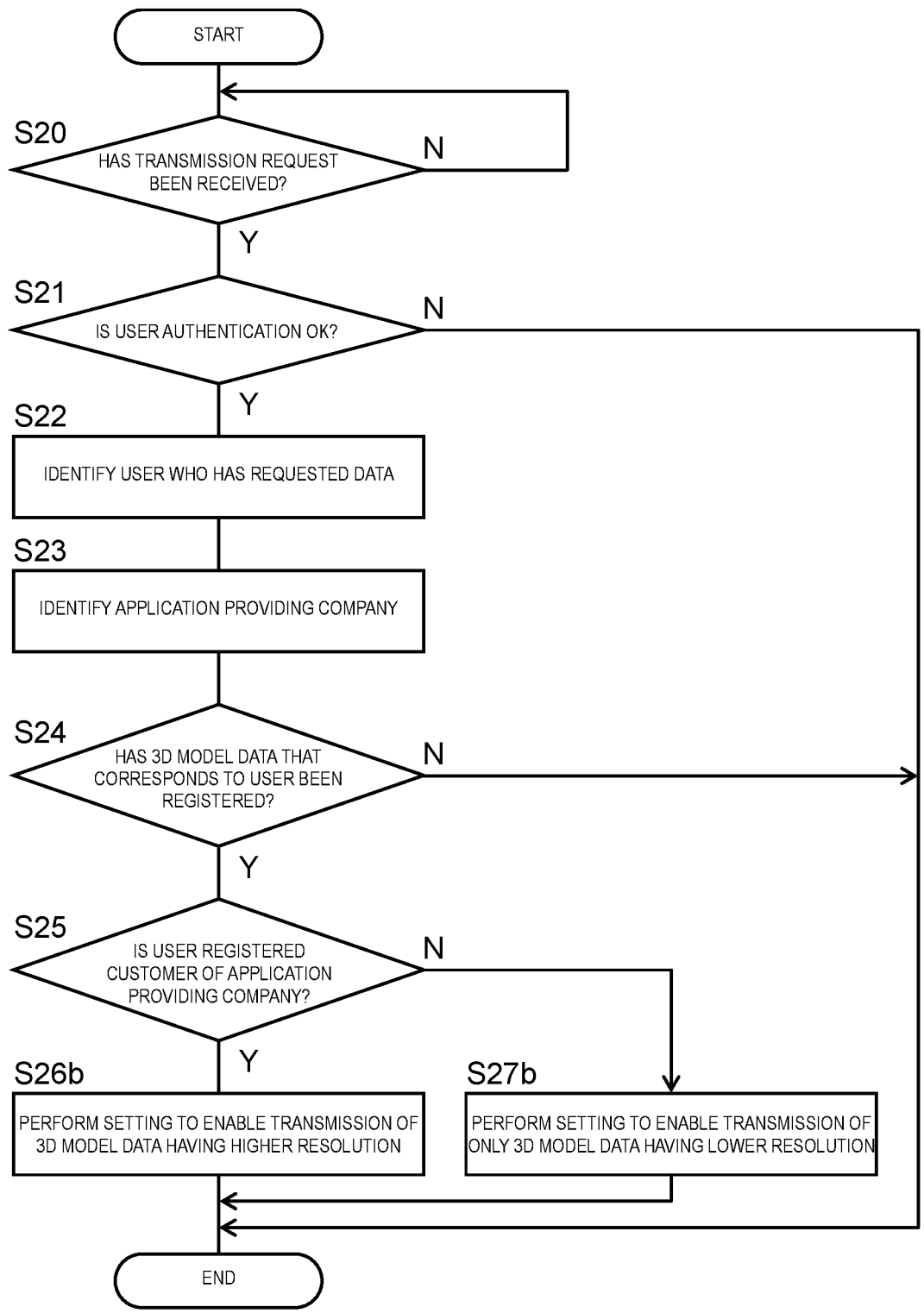
FIG. 6B is a flowchart illustrating data distribution processing (a fourth processing example) that is performed by the 3D model management server.

Stated another way, as illustrated in FIG. 6B, when a user that has issued a transmission request for 3D model data has been registered as a customer of an application providing company of an application relating to the transmission request (YES in S25), controller 111 enables the transmission of 3D model data having a higher resolution (S26b). In contrast, when the user has not been registered as a customer of the application providing company (NO in S25), controller 111 enables the transmission of only 3D model data having a lower resolution (S27b).

By doing this, when a user is a customer of a company that has provided an application, the user can obtain 3D model data having a higher resolution. In contrast, when a user is not a customer of a company that has provided an application, the user can only obtain 3D model data having a lower resolution. This is, for example, a case where Company A permits the use of 3D model data having a higher resolution when a user is a registered customer of Company A, and Company A permits the use of only 3D model data having a lower resolution when a user tries using an application in order to consider the use of services provided by the application (in other words, registration as a customer of Company A).

(5) Fifth Processing Example

Figure 7:
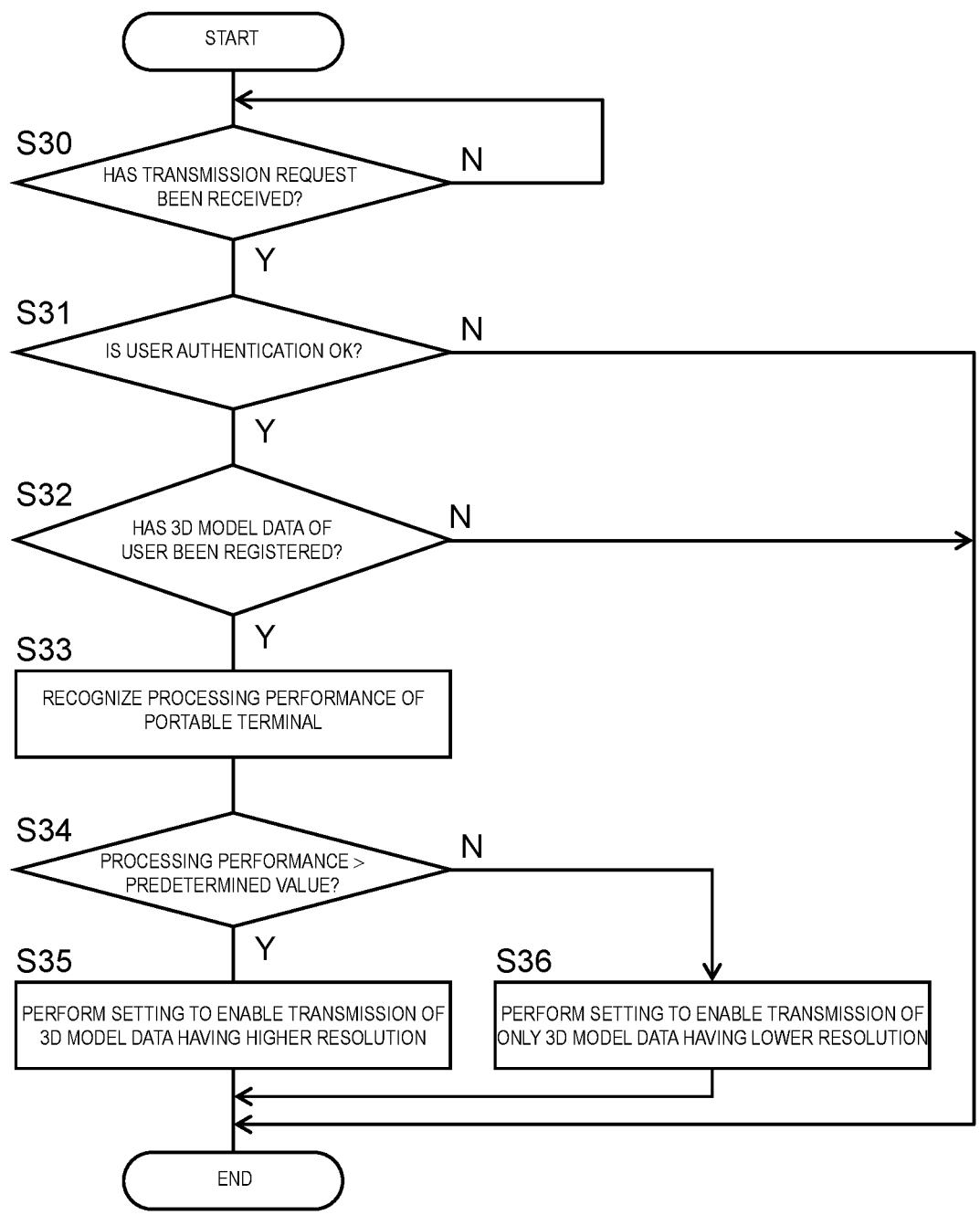
FIG. 7 is a flowchart illustrating data distribution processing (a fifth processing example) that is performed by the 3D model management server.

FIG. 7 is a flowchart that further illustrates a fifth processing example of data distribution processing that is performed by 3D model management server 100. In this example, a resolution of 3D model data that will be enabled to be transmitted to portable terminal 10 is changed according to processing performance of portable terminal 10. In this example, a transmission request to be transmitted from portable terminal 10 to 3D model management server 100 includes information indicating processing performance (for example, an operation frequency of a CPU or instructions per clock cycle (IPC)) of portable terminal 10.

When 3D model management server 100 receives a transmission request from portable terminal 10 (YES in S30), controller 111 refers to user list 133 and performs authentication processing on the basis of user ID and a password that are included in the transmission request (S31). If an authentication result is NG (NO in S31), this processing is terminated.

If an authentication result is OK (YES in S31), controller 111 determines whether 3D model data that corresponds to a user that has issued the transmission request for 3D model data has been registered in 3D model information 135 (S32). When the 3D model data that corresponds to the user has not been registered (NO in S32), this processing is terminated.

When the 3D model data that corresponds to the user has been registered (YES in S32), controller 111 obtains information that is included in the transmission request and indicates processing performance of portable terminal 10 (S33). Controller 111 compares the processing performance with a predetermined value. If the processing performance exceeds the predetermined value (YES in S34), controller 111 enables the transmission of 3D model data having a higher resolution (S35). In contrast, when the processing performance is less than or equal to the predetermined value (NO in S34), controller 111 enables the transmission of only 3D model data having a lower resolution (S36).

By performing the control described above, appropriate 3D model data according to the processing performance of portable terminal 10 can be transmitted.

In the processing example illustrated in FIG. 5A or FIG. 6A, when the transmission of 3D model data is enabled (S14, S26), a resolution of 3D model data that will be enabled to be transmitted to portable terminal 10 may be changed according to the processing performance of portable terminal 10. In this case, controller 111 obtains information indicating the processing performance of portable terminal 10 that is included in a transmission request, and compares the processing performance with a predetermined value. When the processing performance exceeds the predetermined value, controller 111 enables the transmission of 3D model data having a higher resolution. In contrast, when the processing performance is less than or equal to the predetermined value, controller 111 enables the transmission of 3D model data having a lower resolution.

In addition, a screen size of display 13 of portable terminal 10 may be used instead of the processing performance. In this case, 3D model management server 100 obtains, from portable terminal 10, information indicating the screen size of display 13. When the screen size is greater than a predetermined value, controller 111 may enable the transmission of 3D model data having a higher resolution. When the screen size is less than or equal to the predetermined value, controller 111 may enable the transmission of 3D model data having a lower resolution.

(6) Other Processing Examples

In the processing examples described above, 3D model management server 100 may enable the transmission of only data having a format supported by an application that has issued a transmission request. Therefore, the application transmits information indicating a format (for example, an OBJ format or an FBX format) of 3D model data that is supported by the application, in a transmission request transmitted to 3D model management server 100. When the transmission of 3D model data is enabled, 3D model management server 100 enables the transmission of only data having the format supported by the application that has issued the transmission request.

In addition, in the examples illustrated in FIG. 5A and FIG. 6A, 3D model management server 100 may manage, for each user, contract information relating to the content of a contract between a user and each customer (each application providing company) in user list 133. This contract information includes information indicating whether an expensive contract has been concluded. When the transmission of 3D model data is enabled, 3D model management server 100 may refer to the contract information, and may enable 3D model data having a higher resolution to be transmitted to a user that has concluded an expensive contract. When a user has not concluded an expensive contract, 3D model management server 100 may only enable 3D model data having a lower resolution to be transmitted.

[1-3. Advantageous Effects and the Like]

As described above, 3D model management server 100 according to the present exemplary embodiment is a device that manages 3D model data (an example of three-dimensional model data) that indicates a three-dimensional shape of object 20 (for example, a user), and distributes the 3D model data in accordance with a transmission request from an external device (for example, portable terminal 10). 3D model management server 100 includes: network interface 119 (an example of a communication unit) that performs communication with the external device via network 300; data storage 117 (an example of a storage) that stores 3D model data of a user; and controller 111 (an example of a controller) that controls the transmission of the 3D model data to the external device. The external device transmits the transmission request to 3D model management server 100 in accordance with a predetermined application.

When controller 111 receives the transmission request from the external device, controller 111 determines whether a first company that provides a predetermined application is identical to a second company that possesses a 3D scanner that has generated the 3D model data (an example of an equipment that has been used to generate the three-dimensional model data) (S13), and controller 111 controls the transmission of the 3D model data in accordance with a determination result (S14, S15, S14b, S15b).

By employing the configuration described above, whether the transmission of 3D model data will be enabled and/or a resolution of the 3D model data can be set in accordance with whether an application providing company of an application that has transmitted a transmission request is identical to a company that possesses 3D scanner 50 that has generated the 3D model data.

In addition, the transmission request may include user identification information that uniquely identifies a user. Instead of or in addition to the control described above, when controller 111 receives the transmission request from the external device, controller 111 may determine whether a user identified by the user identification information is a customer of a company that provides a predetermined application (S25), and may control the transmission of 3D model data in accordance with a determination result (S26, S27, S26b, S27b).

By employing the configuration described above, whether the transmission of 3D model data will be enabled and/or a resolution of the 3D model data can be set in accordance with whether a user that has issued a transmission request for the 3D model data is a customer of an application providing company of an application that has transmitted the transmission request.

The exemplary embodiment described above discloses a three-dimensional data distribution method for distributing 3D model data indicating a three-dimensional shape of object 20 from 3D model management server 100 that manages the 3D model data. In the three-dimensional data distribution method, an external device (for example, portable terminal 10) that operates according to a predetermined application transmits a transmission request for 3D model data to 3D model management server 100. When 3D model management server 100 receives the transmission request from the external device, 3D model management server 100 determines whether a first company that provides the predetermined application is identical to a second company that possesses a 3D scanner that has generated the 3D model data (S13), and 3D model management server 100 controls the transmission of the 3D model data to the external device in accordance with a determination result (S14, S15, S14b, S15b).

In addition, the exemplary embodiment described above discloses another three-dimensional data distribution method for distributing 3D model data indicating a three-dimensional shape of object 20 from 3D model management server 100 that manages the 3D model data. In the other three-dimensional data distribution method, an external device that operates according to a predetermined application transmits, to 3D model management server 100, a transmission request for 3D model data, the transmission request including user identification information that uniquely identifies a user. When 3D model management server 100 receives the transmission request from the external device, 3D model management server 100 determines whether a user identified by the user identification information is a customer of a company that provides the predetermined application (S25), and controls whether the transmission of the 3D model data will be enabled in accordance with a determination result (S26, S27, S26b, S27b).

(Other Exemplary Embodiments)

As described above, the exemplary embodiment has been described as an example of a technique disclosed in the present application. However, the technique of the present disclosure is not limited to the exemplary embodiment, and is also applicable to other exemplary embodiments that undergo changes, replacements, additions, omissions, or the like, as appropriate. A new exemplary embodiment can also be made by combining respective components described in the exemplary embodiment above. Thus, other exemplary embodiments are described below as examples.

In the exemplary embodiment described above, a user's body has been three-dimensionally scanned by 3D scanner 50. However, a target to be scanned is not limited to the user's body. The target to be scanned can be an arbitrary object relating to a user.

In the exemplary embodiment described above, pieces of 3D model data that respectively have two types of resolutions, a higher resolution and a lower resolution, have been prepared. However, pieces of 3D model data that respectively have three or more types of resolutions may be prepared. A resolution of 3D model data that will be enabled to be transmitted may be changed according to processing performance, a screen size, or the like of a portable terminal.

In the exemplary embodiment described above, a request for 3D model data has been issued from portable terminal 10 to 3D model management server 100. However, a request for 3D model data can be issued from an arbitrary information processing device (an electronic device) that has been mounted with the predetermined application described above, in addition to the portable terminal.

In the exemplary embodiment described above, a 3D scanner has been described as an equipment used to generate 3D model data. However, the 3D model data may be generated by using an equipment other than the 3D scanner. For example, the 3D model data may be generated by using an information processing device in which 3D painting software has been installed.

In the processing of FIG. 5A or FIG. 5B according to the exemplary embodiment described above, it is determined whether an application providing company is identical to a company that possesses a 3D scanner that has generated 3D model data (first determination) (S13), and the transmission of the 3D model data is controlled (S14, S15, S14b, S15b). Instead of the first determination described above, second determination may be performed to determine whether both companies have a partnership. As a result of the second determination, when both companies have a business partnership, the transmission of the 3D model data may be enabled. When both companies do not have a partnership, the transmission of the 3D model data may be disabled. Alternatively, when both companies have a partnership, 3D model data having a higher resolution may be enabled to be transmitted. When both companies do not have a partnership, 3D model data having a lower resolution may be enabled to be transmitted. Here, the partnership includes, for example, a business cooperative relationship when a company that possesses a 3D scanner or a company that provides services using the 3D scanner requests that an application providing company develop or provide an application for providing the services using the 3D scanner. In addition, the partnership includes a capital partnership, for example, when an application providing company is a subsidiary company of a company that possesses a 3D scanner or a company that provides services using the 3D scanner or when these companies belong to the same corporate group. Further, for example, when a contract or the like has defined that Company A and Company B can mutually use pieces of 3D model data that have been generated by 3D scanners respectively provided by Company A and Company B, in applications that are respectively provided by Company A and Company B, it can also be said that Company A and Company B have a partnership. In this case, 3D model data that has been generated by a 3D scanner provided by Company B can be used in an application provided by Company A, and 3D model data that has been generated by a 3D scanner provided by Company A can be used in an application provided by Company B.

In order to achieve this, 3D model management server 100 stores a customer group list indicating a correspondence relationship between companies for companies having a business partnership, as management information, in data storage 117. Controller 111 refers to the customer group list, and determines whether an application providing company has a partnership with a company that possesses a 3D scanner that has generated 3D model data.

In addition, both the first determination and the second determination described above may be performed. When at least either the first determination or the second determination is "true", 3D model data may be enabled to be transmitted, or 3D model data having a higher resolution may be enabled to be transmitted. In the other cases, 3D model data is disabled from being transmitted, and/or other contents such that 3D model data having a lower resolution may be enabled to be transmitted.

In addition, in the processing of FIG. 6A or FIG. 6B according to the exemplary embodiment described above, it is determined whether a user is a customer of an application providing company (third determination) (S25), and the transmission of 3D model data is controlled (S26, S27, S26b, S27b). Instead of the third determination described above, fourth determination may be performed to determine whether a user is a customer of a company that has a partnership with the application providing company. Whether a company has an appliance with an application providing company can be determined by referring to a customer group list. The customer group list is data obtained by associating an application providing company with a company having a partnership with the application providing company and forming one customer group. As a result of the fourth determination, when a user is a customer of a company that has a partnership with an application providing company, the transmission of 3D model data may be enabled. Otherwise, the transmission of the 3D model data may be disabled. Alternatively, when a user is a customer of a company that has a partnership with an application providing company, 3D model data having a higher resolution may be enabled to be transmitted. Otherwise, only 3D model data having a lower resolution may be enabled to be transmitted. Here, the partnership is similar to a partnership in the case described above.

In addition, both the third determination and the fourth determination described above may be performed. When at least either the third determination or the fourth determination is "true", 3D model data may be enabled to be transmitted, or 3D model data having a higher resolution may be enabled to be transmitted. In the other cases, 3D model data may be disabled from being transmitted, and/or other contents such that 3D model data having a lower resolution may be enabled to be transmitted.

In the exemplary embodiment described above, 3D model management server 100 controls, for example, whether 3D model data will be enabled to be transmitted to a portable terminal that has issued a request for the 3D model data. 3D model management server 100 may similarly control, for example, whether 3D model data will be enabled to be transmitted to an electronic device that is not a portable terminal that has issued a request for the 3D model data. For example, 3D model management server 100 may control, for example, whether 3D model data will be enabled to be transmitted to a device identified by a user instead of or in addition to a portable terminal that has issued a request for the 3D model data.

Programs (applications, utilities, or the like) executed by controller 11 of portable terminal 10 and controller 111 of 3D model management server 100 may be provided by a recording medium such as a digital versatile disk read-only memory (DVD-ROM) or a CD-ROM, or may be downloaded from a server on a network via a communication line. In addition, functions of controller 11, 111 have been realized in cooperation between hardware and software (an application program). However, the functions may be realized by only using a hardware circuit that has been exclusively designed in such a way that predetermined functions are realized. Thus, controller 11, 111 can include a digital signal processor (DSP), a field programmable gate array (FPGA), an application specific integrated circuit (ASIC), or the like rather than a CPU or an MPU.

As described above, the exemplary embodiments have been described as examples of the technique of the present disclosure. For this purpose, the accompanying drawings and the detailed description have been provided.

Accordingly, in order to exemplify the technique described above, components illustrated or described in the accompanying drawings and the detailed description may not only include components that are essential for solving the problems, but may also include components that are not essential for solving the problems. Therefore, the unessential components should not be deemed essential just because the unessential components are illustrated or described in the accompanying drawings and the detailed description.

The exemplary embodiments described above are provided to exemplify the technique according to the present disclosure. Therefore, it is possible to make various changes, replacements, additions, omissions, or the like within the scope of the claims and equivalents thereof.

INDUSTRIAL APPLICABILITY

The present disclosure can be applied to a three-dimensional data distribution device and a three-dimensional data distribution method that distribute, via a network, data indicating a three-dimensional shape of an object (for example, a user).

REFERENCE MARKS IN THE DRAWINGS 1 3D data distribution system
10 portable terminal
20, 20a, 20b object
50, 50a, 50b 3D scanner
100 3D model management server
111 controller of 3D model management server
113 display of 3D model management server
115 operation unit of 3D model management server
116 RAM of 3D model management server
117 data storage of 3D model management server
118 communication interface of 3D model management server
119 network interface of 3D model management server
300 network

The invention claimed is:

1. A three-dimensional data distribution device comprising:
    a communication unit that receives a transmission request, the transmission request being transmitted in accordance with a predetermined application and requesting transmission of three-dimensional model data, the three-dimensional model data indicating a three-dimensional shape of an object; and
    a controller that controls the transmission of the three-dimensional model data,
    wherein the controller makes, based on the transmission request, at least one of a determination as to whether a first company is identical to a second company and a determination as to whether the first company has a partnership with the second company, the first company providing the predetermined application, the second company providing an equipment that has been used to generate the three-dimensional model data, and the controller controls the transmission of the three-dimensional model data in accordance with a result of the at least one of the determinations.

2. The three-dimensional data distribution device according to claim 1, wherein
    the controller performs:
    enabling the transmission of the three-dimensional model data when the first company is identical to the second company; and
    disabling the transmission of the three-dimensional model data when the first company is not identical to the second company.

3. The three-dimensional data distribution device according to claim 1, wherein
    the controller performs:
    enabling the transmission of the three-dimensional model data when the first company is identical to the second company or when the first company has the partnership with the second company; and
    disabling the transmission of the three-dimensional model data when the first company does is not identical to the second company and does not have the partnership with the second company.

4. The three-dimensional data distribution device according to claim 1, wherein
    the controller performs:
    enabling the transmission of the three-dimensional model data having a first resolution when the first company is identical to the second company; and
    enabling the transmission of the three-dimensional model data having a second resolution when the first company is not identical to the second company, the second resolution being lower than the first resolution.

5. The three-dimensional data distribution device according to claim 1, wherein
    the controller performs:
    enabling the transmission of the three-dimensional model data having a first resolution when the first company is identical to the second company or when the first company has the partnership with the second company; and
    enabling the transmission of the three-dimensional model data having a second resolution when the first company is not identical to the second company and does not have the partnership with the second company, the second resolution being lower than the first resolution.

6. The three-dimensional data distribution device according to claim 1, wherein
    the controller changes a resolution of the three-dimensional model data in accordance with processing performance of an external device that the three-dimensional model data will be transmitted to.

7. The three-dimensional data distribution device according to claim 1, wherein
    the controller changes a resolution of the three-dimensional model data in accordance with a screen size of a display of an external device that the three-dimensional model data will be transmitted to.

8. The three-dimensional data distribution device according to claim 1, wherein
    the controller enables transmission of only the three-dimensional model data that corresponds to a format supported by an external device that the three-dimensional model data will be transmitted to.

9. The three-dimensional data distribution device according to claim 1, wherein
    the object includes a user, and
    the three-dimensional model data includes shape information, color information, and skeletal information, the shape information indicating a three-dimensional shape of the user, the color information indicating a color or a pattern of a surface of the user, the skeletal information indicating a position of each portion of a body of the user.

10. A three-dimensional data distribution device comprising:
    a communication unit that receives a transmission request, the transmission request being transmitted in accordance with a predetermined application and requesting transmission of three-dimensional model data, the three-dimensional model data indicating a three-dimensional shape of an object, the transmission request including user identification information that uniquely identifies a user that transmits the transmission request; and a controller that controls the transmission of the three-dimensional model data, wherein the controller makes, based on the transmission request, at least one of a determination as to whether the user identified by the user identification information is a customer of a first company that provides the predetermined application and a determination as to whether the user is a customer of a second company that has a partnership with the first company, and the controller controls the transmission of the three-dimensional model data in accordance with a result of the at least one of the determinations.

11. The three-dimensional data distribution device according to claim 10, wherein the controller performs:

enabling the transmission of the three-dimensional model data when the user is the customer of the first company; and disabling the transmission of the three-dimensional model data when the user is not the customer of the first company.

12. The three-dimensional data distribution device according to claim 10, wherein the controller performs:

enabling the transmission of the three-dimensional model data when the user is at least one of the customer of the first company and the customer of the second company; and disabling the transmission of the three-dimensional model data when where the user is neither the customer of the first company nor the customer of the second company.

13. The three-dimensional data distribution device according to claim 10, wherein the controller performs:

enabling the transmission of the three-dimensional model data having a first resolution when the user is the customer of the first company; and enabling the transmission of the three-dimensional model data having a second resolution when the user is not the customer of the first company, the second resolution being lower than the first resolution.

14. The three-dimensional data distribution device according to claim 10, wherein the controller performs:

enabling the transmission of the three-dimensional model data having a first resolution when the user is at least one of the customer of the first company and the customer of the second company; and enabling the transmission of the three-dimensional model data having a second resolution when where the user is neither the customer of the first company nor the customer of the second company, the second resolution being lower than the first resolution.

15. The three-dimensional data distribution device according to claim 10, wherein the controller changes a resolution of the three-dimensional model data in accordance with processing performance of an external device that the three-dimensional model data will be transmitted to.

16. The three-dimensional data distribution device according to claim 10, wherein the controller changes a resolution of the three-dimensional model data in accordance with a screen size of a display of an external device that the three-dimensional model data will be transmitted to.

17. The three-dimensional data distribution device according to claim 10, wherein the controller enables transmission of only the three-dimensional model data that corresponds to a format supported by an external device that the three-dimensional model data will be transmitted to.

18. The three-dimensional data distribution device according to claim 10, wherein the object includes a user, and the three-dimensional model data includes shape information, color information, and skeletal information, the shape information indicating a three-dimensional shape of the user, the color information indicating a color or a pattern of a surface of the user, the skeletal information indicating a position of each portion of a body of the user.

19. A three-dimensional data distribution method for distributing three-dimensional model data indicating a three-dimensional shape of an object, the three-dimensional data distribution method comprising:

receiving a transmission request, the transmission request being transmitted in accordance with a predetermined application and requesting transmission of the three-dimensional model data;

making, based on the transmission request, at least one of a determination as to whether a first company is identical to a second company and a determination as to whether the first company has a partnership with the second company, the first company providing the predetermined application, the second company providing an equipment that has been used to generate the three-dimensional model data; and controlling the transmission of the three-dimensional model data in accordance with a result of the making of the least one of the determinations.

20. A three-dimensional data distribution method for distributing three-dimensional model data indicating a three-dimensional shape of an object, the three-dimensional data distribution method comprising:

receiving a transmission request, the transmission request being transmitted in accordance with a predetermined application and requesting transmission of the three-dimensional model data, the transmission request including user identification information that uniquely identifies a user that transmits the transmission request;

making, based on the transmission request, at least one of a determination as to either whether the user identified by the user identification information is a customer of a first company that provides the predetermined application and a determination as to whether the user is a customer of a second company that has a partnership with the first company; and controlling the transmission of the three-dimensional model data in accordance with a result of the making of the least one of the determinations.

* * * * *